(12) United States Patent
Hunter et al.

(10) Patent No.: US 7,865,800 B2
(45) Date of Patent: Jan. 4, 2011

(54) SYSTEM AND METHOD FOR COOPERATION DIVERSITY THROUGH CODING

(75) Inventors: Todd E. Hunter, Lewisville, TX (US); Aria Nosratinia, Plano, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 1656 days.

(21) Appl. No.: 10/360,971

(22) Filed: Feb. 7, 2003

(65) Prior Publication Data
US 2003/0148732 A1 Aug. 7, 2003

Related U.S. Application Data

(60) Provisional application No. 60/355,493, filed on Feb. 7, 2002.

(51) Int. Cl.
*H03M 13/00* (2006.01)
(52) U.S. Cl. .................. 714/758; 375/267; 455/101
(58) Field of Classification Search ............... 714/758; 375/267; 455/101
See application file for complete search history.

(56) References Cited

U.S. PATENT DOCUMENTS

| | | | | | |
|---|---|---|---|---|---|
| 4,584,685 | A | * | 4/1986 | Gajjar | 714/751 |
| 4,978,946 | A | * | 12/1990 | Nordholm et al. | 340/573.1 |
| 5,537,414 | A | * | 7/1996 | Takiyasu et al. | 370/347 |
| 5,539,730 | A | * | 7/1996 | Dent | 370/280 |
| 5,659,574 | A | * | 8/1997 | Durrant et al. | 375/150 |
| 6,249,669 | B1 | * | 6/2001 | Ogino et al. | 455/63.1 |
| 6,370,135 | B1 | * | 4/2002 | Gardner | 370/352 |
| 6,452,941 | B1 | * | 9/2002 | Bruhn | 370/468 |
| 6,760,393 | B1 | * | 7/2004 | Alisobhani et al. | 375/365 |
| 7,206,295 | B2 | * | 4/2007 | Seguin | 370/328 |
| 2004/0102202 | A1 | * | 5/2004 | Kumaran et al. | 455/515 |

OTHER PUBLICATIONS

Ryuji Kohno, Subbarayan Pasupathy, Hideki Imai and Mitsutoshi Hatori, A robust ADPCM system using an error-correcting code, 1986, IEEE, vol. 11 and pp. 3092-3093.*

H. Yanikomeroglu, "Fixed and Mobile Relaying Technologies for Cellular Networks," in *Proceedings of the Second Annual Workshop on Applications and Services in Wireless Networks (ASWN '02)*, pp. 75-81, Jul. 3-5, 2002, Paris, France.

A. Sendonaris, E. Erkip and B. Aazhang, "Increasing Uplink Capacity via User Cooperation Diversity," in *Proceedings of the IEEE International Symposium on Information Theory (ISIT)*, p. 156, Cambridge MA, Aug. 16-21, 1998.

(Continued)

*Primary Examiner*—Scott T Baderman
*Assistant Examiner*—Enam Ahmed
(74) *Attorney, Agent, or Firm*—Daniel J. Chalker; Chalker Flores, LLP

(57) ABSTRACT

A method for providing wireless transmission diversity wherein an error correcting codeword is divided into first and second segments at first and second transmitting units. The first segments are transmitted from each of the first and second transmitting units and received at the first and second transmitting units, respectively. The received first segments are decoded and, responsive to the decoding, transmission of a second segment is made from each of the first and second transmitting units.

24 Claims, 5 Drawing Sheets

OTHER PUBLICATIONS

A. Sendonaris, E. Erkip and B. Aazhang, "User Cooperation Diversity—Part 1: System Description," submitted to *IEEE Transactions on Communications*.

A. Sendonaris, E. Erkip and B. Aazhang, "User Cooperation Diversity—Part 11: Implementation Aspects and Performance Analysis," submitted to *IEEE Transactions on Communications*.

J. N. Laneman and G. W. Wornell, "Energy-Efficient Antenna Sharing and Relaying for Wireless Networks," in *Proceedings IEEE Wireless Communications and Networking Conference (WCNC)*, pp. 7-12, Chicago, IL, Sep. 2000.

J. N. Laneman and G. W. Wornell and D. N. C. Tse, "An Efficient Protocol for Realizing Cooperative Diversity in Wireless Networks," in *Proceedings IEEE International Symposium on Information Theory (ISIT)*, p. 294, Washington, D.C., Jun. 2001.

J. N. Laneman and G. W. Wornell, "Exploiting Distributed Spatial Diversity in Wireless Networks," in *$38^{th}$ Annual Allerton Conference on Communications, Control and Computing*, pp. 775-784, Oct. 2000.

J. N. Laneman and G. W. Wornell, "Distributed Space-Time Coded Protocols for Exploiting Cooperative Diversity in Wireless Networks," *IEEE*, 2002.

A. Stefanov and E. Erkip, "Cooperative Information Transmission in Wireless Networks," in *Proceedings $2^{nd}$ IEEE Asian-European Workshop on Concepts in Information Theory*, pp. 90-93, Breisach, Germany, Jun. 26-29, 2002.

Y-S Tu and G. J. Pottie, "Coherent Cooperative Transmission from Multiple Adjacent Antennas to a Distant Stationary Antenna through AWGN Channels," 2002 *IEEE*, pp. 130-134.

K. J. Quirk, M. Srinivasan, J. R. Agre, "Cooperative Modulation Techniques for Long Haul Relay in Sensor Networks," 2001 *IEEE*, pp. 1171-1175.

J. Boyer, D. Falconer and H. Yanikomeroglu, "A Theoretical Characterization of the Multihop Wireless Communications Channels," to appear in *Proceedings of Canadian Workshop on Information Theory*, 2001.

J. Boyer, D. Falconer and H. Yanikomeroglu, "A Theoretical Characterization of the Multihop Wireless Communications Channels Without Diversity," submitted to IEEE International Symposium on Personal, Indoor and Mobile Radio Communications (PIMRC), 2001.

A. Stefanov and E. Erkip, "Cooperative Information Transmission in Wireless Networks," in *Proceedings $2^{nd}$ IEEE Asian-European Workshop on Concepts in Information Theory*, pp. 90-93, Breisach, Germany, Jun. 26-29, 2002.

V. Emamian, P. Anghel, M. Kaveh, "Multi-User Spatial Diversity in a Shadow-Fading Environment," 2002 *IEEE*, pp. 573 576.

V. Sreng, H. Yanikomeroglu and D. Falconer, "Coverage Enhancement through Two-hop Relaying in Cellular Radio Systems," submitted to *IEEE Wireless Communications and Networking Conference* (WCNC), 2002.

A. Stefanov and E. Erkip, "Cooperative Coding for Wireless Networks," in *Proceedings of IEEE Conference on Mobile and Wireless Communications Networks*, Stockholm, Sweden, Sep. 2002.

A. Høst-Madsen, "On the Capacity of Wireless Relaying," in *Proceedings of IEEE Vehicular Technology Conference (VTC), Fall 2002*, Vancouver, British Columbia, Canada.

A. Høst-Madsen, "On the Capacity of Cooperative Diversity in Slow Fading Channels," in *Proceedings of 40th Annual Allerton Conference on Communication, Control, and Computing*, Oct. 2002, Urbana-Champaign, Illinois.

\* cited by examiner

SYSTEM AND METHOD FOR COOPERATION DIVERSITY THROUGH CODING

RELATED APPLICATION(S)

This Application claims priority from and incorporates herein by reference the entire disclosure of U.S. Provisional Application Serial No. 60/355,493 filed Feb. 7, 2002.

TECHNICAL FIELD

The present invention relates to the mitigation of multipath fading in wireless channels, and more particularly, to the use of transmission diversity for mitigating the effects of multipath fading in wireless channels.

BACKGROUND OF THE INVENTION

Multipath fading involves the dynamic reduction of the signal level of a radio communication signal at specific locations due to the combining of incoming signals that travel multiple, alternative paths. Multipath fading occurs because the path links between transmitters and receivers differ, and the incoming multipath signals cancel each other at the specific points where the signal levels are inverted. One technique for mitigating the effects of multipath fading in wireless channels is diversity. Diversity refers to a number of methods by which multiple copies of a signal that experience independent fading are provided to a receiver.

One form of diversity that has received considerable attention in recent years is transmit diversity. Transmit diversity uses multiple antennas to transmit copies of a signal to a receiver through several independent fading paths. The various known transmit diversity schemes involve different designs for the transmitted signals to enable the receiver to process the signals with a minimum of added complexity. Some systems introduce a new class of channel codes, known as space-time trellis codes, designed for multiple transmit antennas to provide both diversity and coding gain. The decoding complexity of these systems is comparable to that of existing trellis codes.

However, these and other types of transmit diversity methods are not applicable to an uplink of a cellular or other types of wireless systems because the size of mobile units typically precludes the use of multiple antennas. Previously proposed user cooperation methods also suffer from several shortcomings. First, they all involve some form of repetition which from a channel coding point of view may not be the best use of available bandwidth. Also, existing schemes either admit forwarding of erroneous estimates of a partner's symbols, or include propagation of a partner's noise. Error propagation diminishes the performance of transmissions, especially when the channel between partners is poor. Previous schemes also require that either the instantaneous bit error rate (BER) or signal-to-noise (SNR) of the channel between the partners be known at the base station for optimal maximum likelihood detection or decoding. In practice, it may be difficult to store sufficient information to reproduce the analog signal. Therefore, there has arisen a need for a cooperative transmission system and method that would be useful in cellular system environments and other similar types of environments.

SUMMARY OF THE INVENTION

The present invention overcomes the foregoing and other problems with a method for providing wireless transmission diversity wherein an error correcting codeword is divided into first and second segments at each of a first transmitting unit and a second transmitting unit. The first segments of the error correcting codewords are transmitted from each of the first and second transmitting units such that they are received at each of the first and second transmitting units. The received first segments are decoded at each of the first and second transmitting units, and responsive to this decoding, transmission of the second segment is made from each of the first and second transmitting units.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
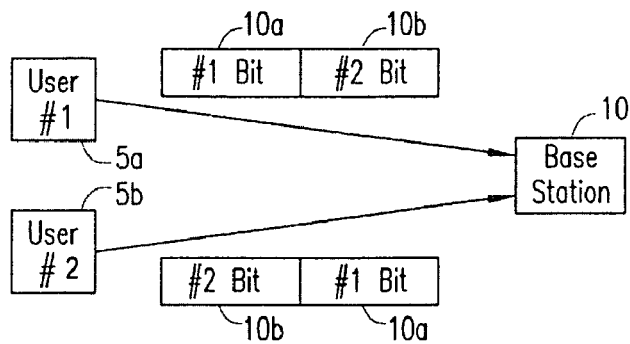
FIG. 1 illustrates a first example of an existing transmit diversity system.
Figure 2:
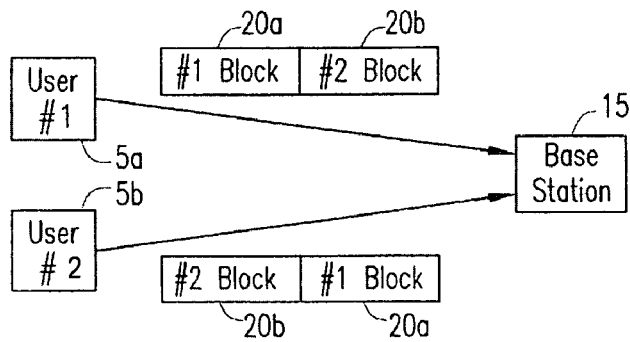
FIG. 2 illustrates a second example of an existing transmit diversity system.

Referring now to the drawings, and more particularly to FIGS. 1 and 2, signal diversity is achieved by a scheduling scheme that enables two users to send their information using both of their antennas. FIG. 1 illustrates one existing method in which each user 5 cooperatively transmits one bit over two successive symbol periods 10 to a base station 15. The users 5 transmit their own bits in the first symbol period 10a. Each user 5 receives and detects the bit transmitted by the other user 5, and transmits the resulting estimate of the received bit during the second symbol period 10b.

FIG. 2, illustrates another system utilizing a similar scheme for ad-hoc wireless networks as that illustrated in FIG. 1 except that each transmission period 10 corresponds to a coded block of symbols rather than a single symbol period. Each user 5 either amplifies and forwards a partner users 5 received signal, or decodes the symbols and retransmits using a same code. The choice of cooperative strategy depends on the quality of the channel between the partnering users. Both of these schemes improves system performance in terms of capacity and outage probability despite a noisy channel between the users.

Figure 3:
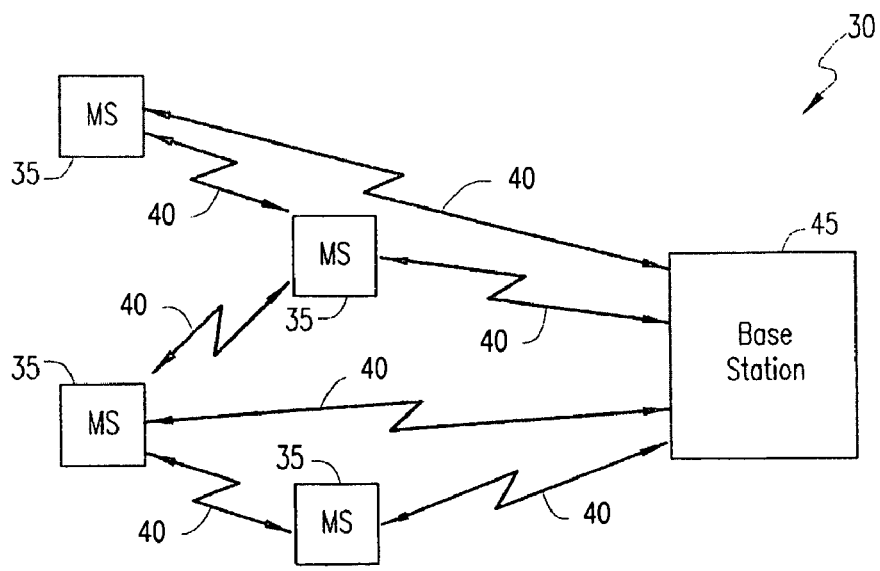
FIG. 3 illustrates a wireless cellular network for implementing the system and method of the present invention.

From a channel coding perspective, the cooperative schemes described in FIGS. 1 and 2 may be viewed as a form of repetition coding. Given that repetition codes are poor codes, a scheme that incorporates cooperation within the framework of existing channel codes would be more desirable. Referring now to FIG. 3, there is illustrated a wireless cellular network 30 consisting of a number of mobile stations 35 (users) having communication channels 40 with a base station 45. The cellular network 30 employs a multiple access protocols that allow the base station 45 (and other mobile stations 35 in the cooperative case) to separately detect each mobile station. However, the present invention does not depend upon the specifics of any particular protocol. Thus, any system such as CDMA, TDMA, FDMA, or any other multiple access protocol may be utilized.

Figure 4:
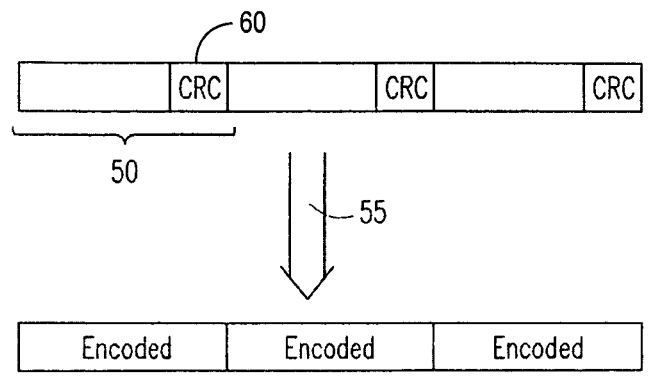
FIG. 4 illustrates the manner in which source data from a mobile station is segmented for coding and transmission according to the present invention.

Referring now also to FIG. 4, each mobile station 35 segments source data to be transmitted by the user into blocks 50 of K bits and includes a number of additional bits 60 for a CRC code. The blocks are encoded at 55 for block transmission from the mobile station 35 using existing channel codes. Various channel coding methods may be used within the coded cooperation framework. For example, the overall code may be a block or convolutional code, or a combination of both. Alternatively, other types of error correcting codes may be used. The mobile stations 35 use a BPSK modulation scheme with all users having the same transmit power. The channels 40 between mobile stations 35 and between each mobile station and the base station 45 are mutually independent and subject to flat, slow Rayleigh fading. The fading coefficients are assumed to remain constant over each input block. Furthermore, the receivers at the mobile stations 35 and base station 45 track the fading coefficients and employ coherent detection so that only the magnitudes of the fading coefficients need be considered.

The baseband-equivalent discrete-time signal transmitted by a particular user i as:

$$S_i(n) = \sqrt{E_b} \cdot b_i(n) \quad (1)$$

where $E_b$ is the transmitted energy per unit and $b_i(n) \in \{-1, +1\}$ is the information-bearing component of the signal. The corresponding signal received by user j (where j=0 denotes the base station) is:

$$r_{ij}(n) = \alpha_{ij} s_i(n) + z_j(n) = \alpha_{ij} \sqrt{E_b} \cdot b_i(n) + z_j(n) \quad (2)$$

where $\alpha_{ij}$ is the fading coefficient magnitude between users i and j and $z_j(n)$ is the AWGN receiver noise sample. The noise samples have zero mean and variance $N_j/2$, and are mutually independent. The quality of each channel is quantified by the average SNR with respect to the fading distribution:

$$E_{aij}[SNR_{ij}] = E_{aij}\left[\frac{a_{ij}^2 E_b}{N_j}\right] = \overline{a_{ij}^2}\frac{E_b}{N_j} \quad (3)$$

Figure 5:
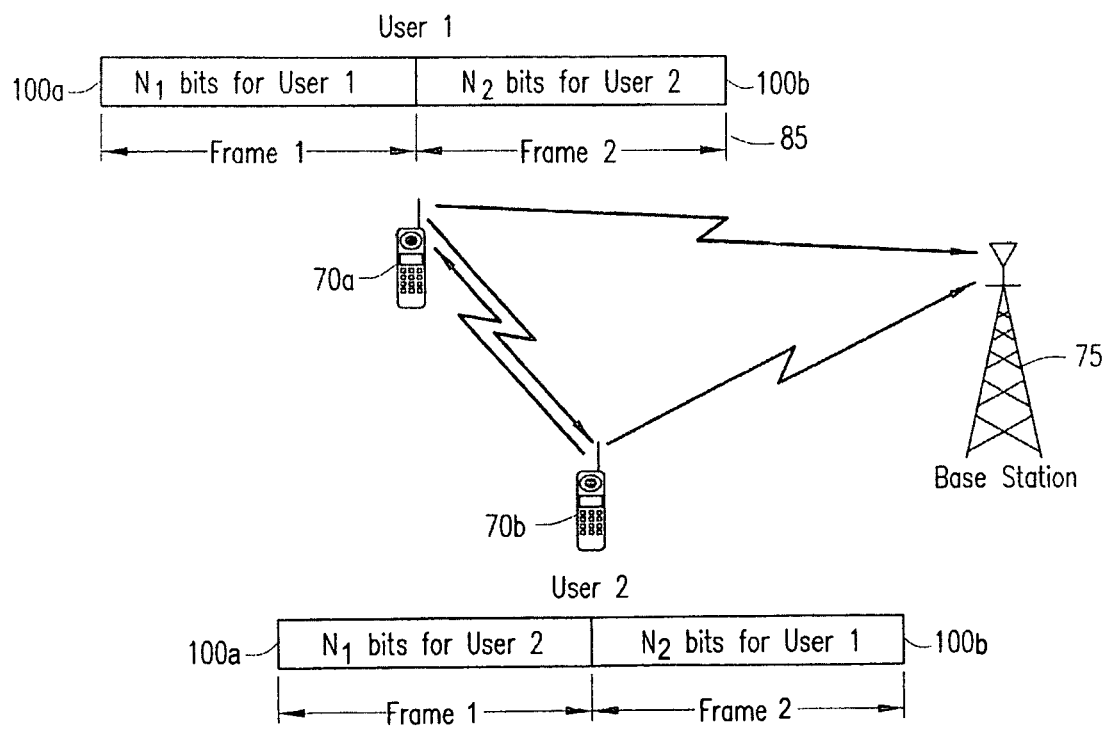
FIG. 5 illustrates the cooperative transmission scheme according to the present invention.
Figure 6:
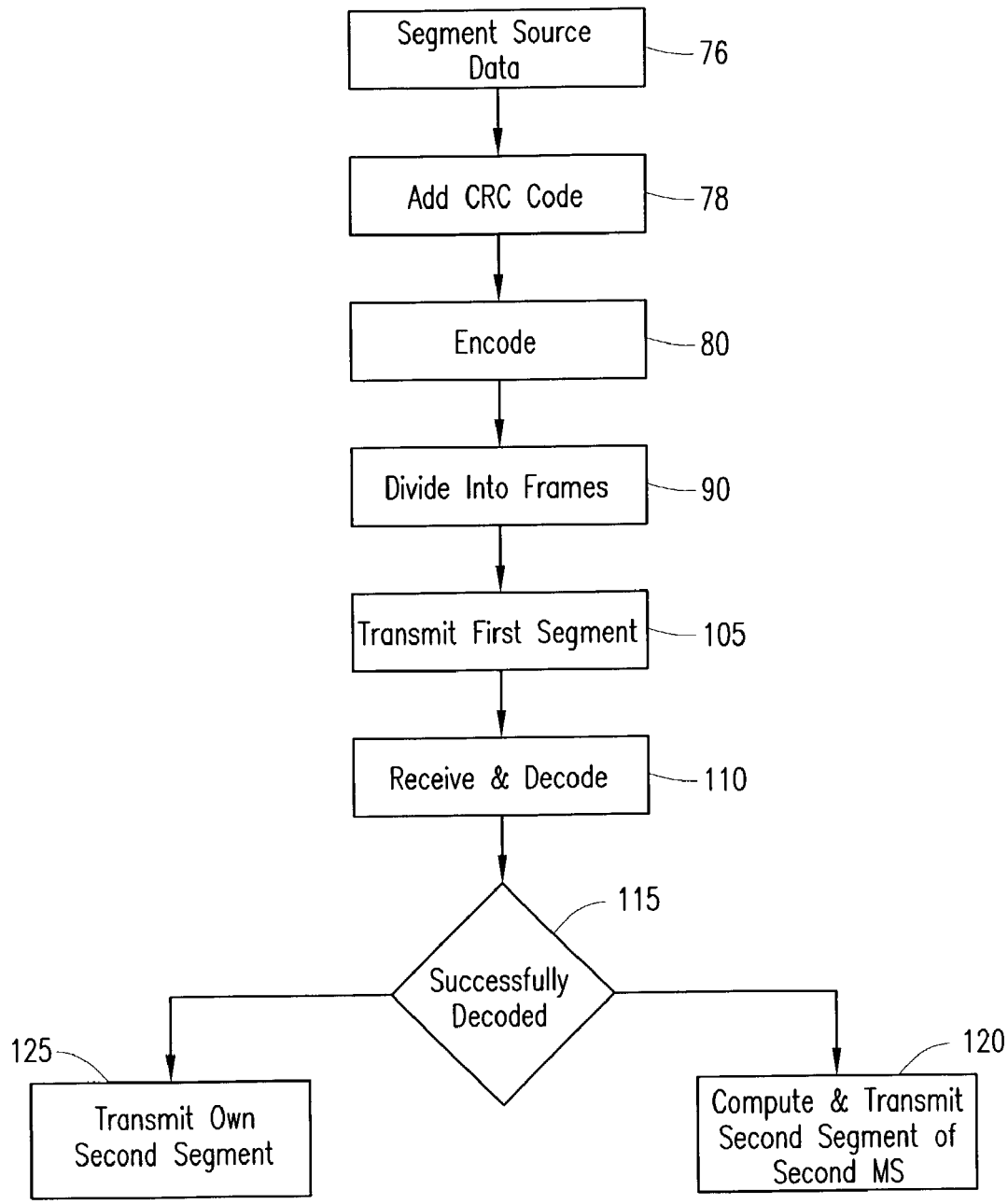
FIG. 6 is a flow diagram illustrating the method of operation of the system illustrated in FIG. 5.

Referring now to FIGS. 5 and 6, there is more fully illustrated the system of the present invention and a flow chart describing the operation of the system. Two mobile stations 70, including a transmitter and receiver, cooperatively transmit their codewords with the same transmit power and information rate as a comparable noncooperative system. The mobile stations 70 share their antennas such that a portion of each mobile station's codebits are received at the base station 75 through a different, independent fading channel from the others. In this way, diversity is achieved in a manner similar to channel coding with time interleaving, but without associated delay in the case of a slowly fading channel. Two noteworthy features of the proposed system are that the operation and performance are independent of the multiple access protocol. Thus, the scheme works equally well with CDMA, TDMA, FDMA or any other multiple access system. Also, previously reported cooperation diversity schemes work well when the interuser channel is as good or better than the channels to the base station. However, significant gains are possible with the present system even when an interuser channel signal to noise ratio (SNR) 20 dB below the channels to the base station is present.

According to the system and method of the present invention, the mobile stations 70 segment their source data into blocks at step 76 and augment the blocks with a cyclic redundancy check (CRC) code at step 78 such that there are a total of K bits per source block (including the CRC bits). The mobile stations 70 next encode at step 80 the source blocks to be transmitted to the base station 75 and the other mobile station 70 using an error correcting code, such that for an overall rate R code, there are N=K/R total code bits per codeword. As described previously, various error correcting codes may be used including block or convolutional codes, a combination thereof or any other known error correcting code. The N code bits of the codeword are divided at step 90 into two successive time segments or frames. The division or partitioning of the codewords for the two frames may be achieved through puncturing, product codes, or other forms of concatenation. The first segment of $N_1 = K/R_1$ bits forms the corresponding codeword for the rate $R_1$ code, and the second segment are the additional $N_2 = N - N_1$ bits for the rate R codeword. In the first frame 100a, the mobile stations 70 transmit at step 105 their own first set of $N_1$ bits. They also receive and decode at step 110 the partner mobile station's transmission. If mobile station 70a successfully decodes mobile station's 70b data, as determined by using the CRC code at inquiry step 115, mobile station 70a computes and transmits mobile station's 70b second set of $N_2$ bits in the second frame 100b at step 120. Otherwise, mobile station 70a transmits its own second set of bits at step 125. Mobile station 70b acts similarly, and each mobile station always transmits a total of N bits per source block 85.

The level of cooperation is defined as $N_2/N$, the percentage of the partner's bits transmitted relative to the total number of bits. A smaller percentage implies a more powerful code for the first frame 100a and increased probability that a user successfully decodes the bits of their partner. However, this also means a smaller $N_2$, thus reducing the degree of diversity. The effects of varying the level of cooperation will be more fully discussed in a moment.

Figure 7:
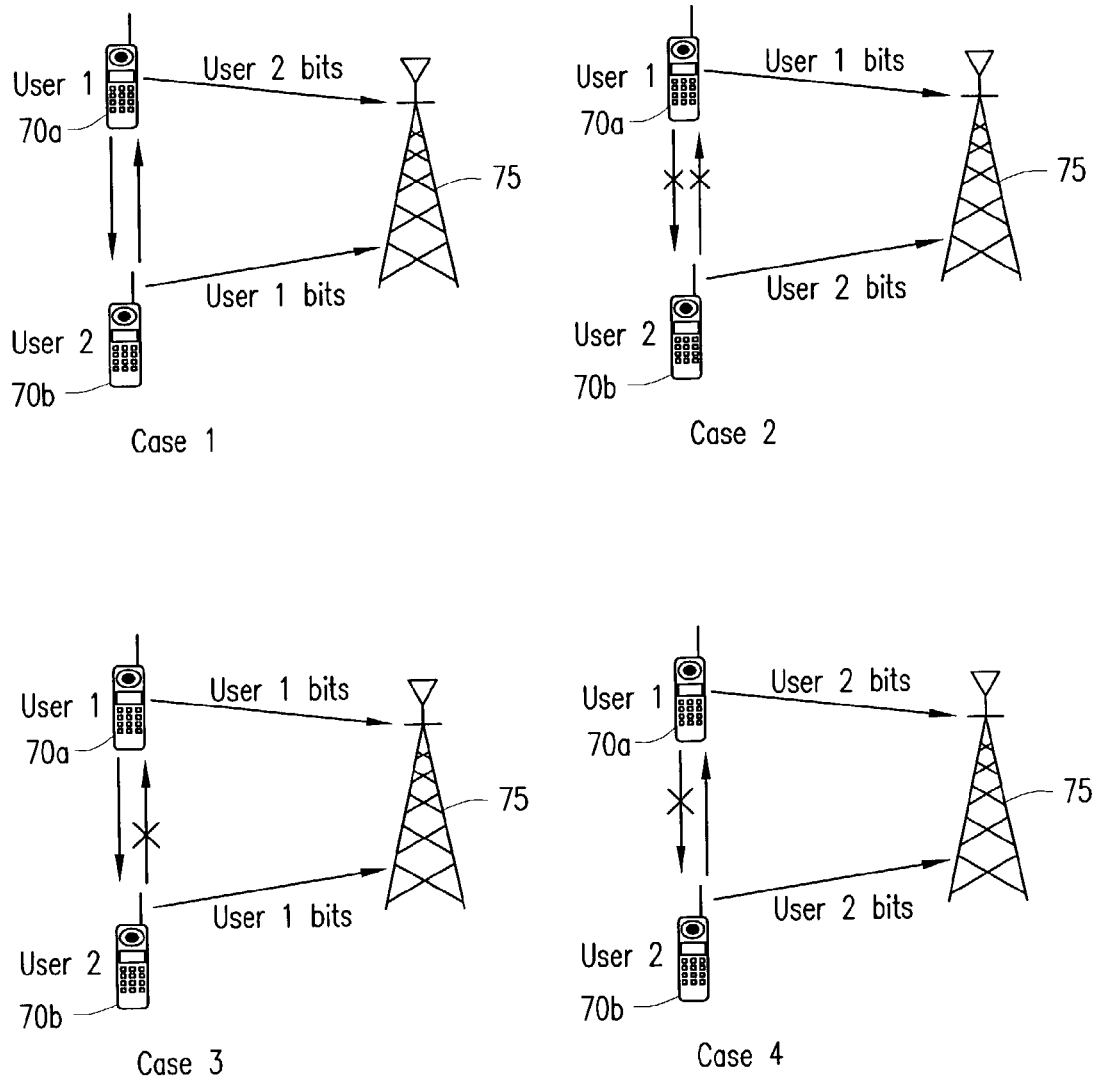
FIG. 7 illustrates four cooperative cases for second frame transmission based on first frame decoding results.

The mobile stations 70 act independently in the second frame 100b, with no knowledge of whether their first frame 100a was correctly decoded by their partner. As a result, there are four possible cooperative cases for the transmission of the second frame 100b. These cases are illustrated in FIG. 7. In Case 1, both mobile stations successfully decode their partners, so that they each send their partner's second set of code bits in the second frame 100b, resulting in the fully cooperative scenario depicted in FIG. 5. In Case 2, neither mobile station successfully decodes their partner's first frame 100a, and the system reverts to the non-cooperative case for that pair of source blocks. In Case 3, mobile station 70b successfully decodes mobile station 70a, but mobile station 70a does not successfully decode mobile station 70b. Consequently, neither mobile station transmits the second set of code bits for mobile station 70b in the second frame 100b, but instead both transmit the second set of data for mobile station 70a. These two independent copies of mobile station 701 bits are combined via maximal ratio combining at the base station 75 prior to decoding. Case 4 is identical to Case 3 with the roles of mobile station 70a and mobile station 70b reversed. Clearly the base station 75 must know which of these four cases has occurred in order to correctly decode the received bits.

For the base station 75 to correctly interpret the received bits, each user must indicate whether the partner's data was decoded successfully from the first frame 100a. One approach is to have each user send one additional bit in the second frame to indicate whether the partner was successfully decoded. This bit would have to be strongly protected via repetition coding, which introduces a tradeoff between the rate loss incurred and the impact on performance of imperfect knowledge at the base station.

An alternative approach, in which the base station simply decodes according to each of the four cooperative cases in succession, according to their relative probabilities of occurrence, until the CRC code indicates correct decoding. This strategy maintains the overall system performance and rate at the cost of some added complexity at the base station. Under most conditions this added complexity is 10% or less.

Figure 8:
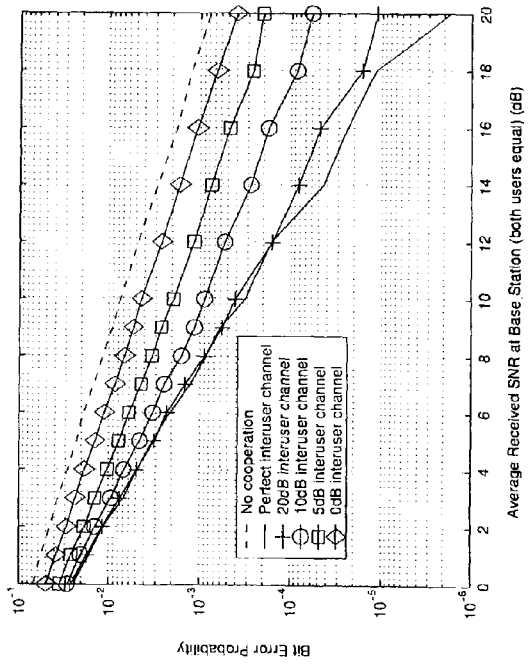
FIG. 8 illustrates simulation results for an exemplary system.

The performance of this cooperative scheme was evaluated via simulations in which the bit error rate was considered for each user at the base station 75. To produce these results we implemented the user cooperation scheme using rate-compatible punctured convolutional (RCPC) codes. In this implementation, the overall rate R code is selected from a given RCPC code family (for example, the mother code). The code word for the first segment is then obtained by applying the puncturing matrix corresponding to rate R1, and the additional code bits for the second segment are those bits that are punctured in the first frame. For the simulations, the family of RCPC codes with memory M=4 and puncturing period P=8 was used and rate R=¼ (the mother code for this family) was selected. The source block size was K=128 bits. All receivers are assumed to maintain perfect channel state information, and the fading coefficients were varied independently for each data block in a Monte Carlo fashion to obtain average BER's over the channel fading distributions. The simulation for results for these various case are illustrated in FIGS. 8, 9 and 10.

When two mobile stations 70 have statistically similar channels to the base station 75, i.e., their average received SNR's are equal, there is a marked improvement for both users over the noncooperative system. FIG. 8 illustrates that the improvement decreases as the interuser channel quality worsens, since cooperation occurs for a smaller percentage of the blocks. However, the cooperation provides a significant gain even when the interuser channel quality is well below that of the user channels to the base station 75. For example, when the interuser channel has an average SNR of 0 dB, cooperation provides a diversity gain of almost 3 dB when the user channels to the base station 75 have an average SNR of 15 dB.

Figure 9:
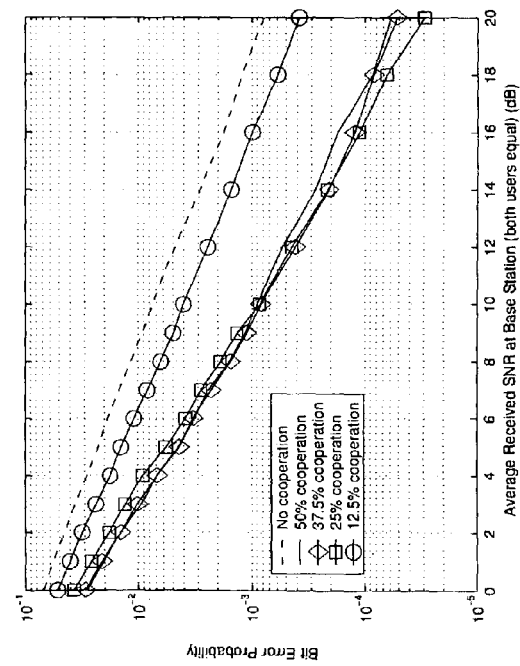
FIG. 9 illustrates simulation results for an exemplary system.

FIG. 9 illustrates that the gain from cooperation is relatively insensitive to the level of cooperation until it falls below 25%. Since the rate ¼ code has four code bits per branch, the RCPC code puncturing pattern for 25% cooperation corresponds to exactly 1 bit for each branch being transmitted by the partner. Thus, below 25% cooperation there will be some branches that have no diversity at all. This is likely the cause of the increase in BER from 25% to 12.5% cooperation shown in FIG. 9.

Figure 10:
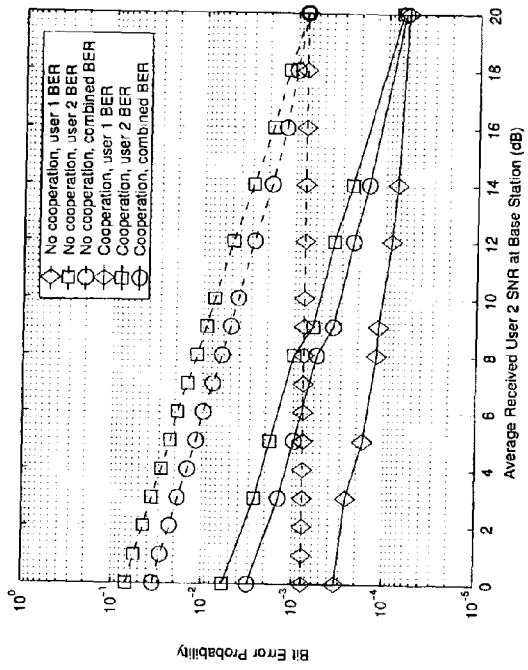
FIG. 10 illustrates simulation results for an exemplary system.

When the two users have statistically dissimilar channels to the base station 75, FIG. 10 shows that the BER for the users with the worst channel improves significantly with cooperation, as does the combined BER for both users. More interestingly, the user with the better channel also improves, a result that is not necessarily intuitive. In the simulation results shown in FIG. 10, User 1, with an uplink SNR of 20 dB, improves with cooperation diversity even while the partner's channel is as much as 20 dB worse. Thus, even the user with a better channel has motivation to cooperate. This is an effect that has not been observed in existing cooperation schemes.

Thus, the above system enables two users to share their antennas to achieve transmission diversity in the uplink of a cellular network. Cooperation is incorporated with channel coding so that, for a slow fading environment, each user's codeword is divided into two parts which are transmitted to the base station 75 over independent fading channels. Each user employs the CRC code to determine when he has correctly decoded the partner's data and can thus successfully cooperate. The proposed cooperative scheme does not require additional transmit bandwidth, and decoding complexity is the same as that for a noncooperative system. Additionally, the scheme does not depend on any particular multiple access protocol. Simulation results indicate that this scheme provides significant improvement in BER for both users, even when the interuser channel is much worse that either user channel to the base station, and when one user has a significantly better channel than the other to the base station.

The previous description is of a preferred embodiment for implementing the invention, and the scope of the invention should not necessarily be limited by this description. The scope of the present invention is instead defined by the following claims.

What is claimed is:

1. A method for wireless uplink transmission diversity, comprising the steps of:

dividing an uplink error correcting codeword into a first uplink segment and a second uplink segment for a first mobile station and a second mobile station at the respective mobile stations;

transmitting the first uplink segment for the first mobile station from the first mobile station to both the second mobile station and a base station;

transmitting the first uplink segment for the second mobile station from the second mobile station to both the first mobile station and the base station;

receiving the transmitted first uplink segment for the first mobile station at both the second mobile station and the base station;

decoding the received first uplink segment for the first mobile station at the second mobile station;

receiving the transmitted first uplink segment for the second mobile station at both the first mobile station and the base station;

decoding the received first uplink segments for the second mobile station at the first mobile station; and responsive to the decoding of the received first uplink segments, transmitting the second uplink segments from each of the first mobile station and the second mobile station to the base station.

2. The method of claim 1, further comprising the steps of:

dividing source data into blocks;

adding bits to the blocks for a CRC code; and encoding the blocks using an error correcting code to create the uplink error correcting codeword.

3. The method of claim 1, wherein the step of decoding further comprises the step of decoding the received first uplink segments using a CRC code at each of the first mobile station and the second mobile station.

4. The method of claim 1, wherein the step of transmitting the second uplink segments further comprises the step of transmitting the second uplink segment of the second mobile station from the first mobile station to the base station if the first mobile station decodes the first uplink segment of the second mobile station.

5. The method of claim 1, wherein the step of transmitting the second uplink segment further comprises the step of transmitting the second uplink segment of the first mobile station from the first mobile station to the base station if the first mobile station cannot decode the first uplink segment of the second mobile station.

6. A method for wireless uplink transmission diversity, comprising the steps of:
   dividing source data into blocks at each of a first mobile station and a second mobile station;
   adding bits to blocks for a CRC code at each of the first mobile station and the second mobile station;
   encoding the blocks using an error correcting code to create an uplink error correcting codeword at each of the first mobile station and the second mobile station;
   dividing the uplink error correcting codeword into a first uplink segment and a second uplink segment for the first mobile station and the second mobile station at the respective mobile stations;
   transmitting the first uplink segment for the first mobile station from the first mobile station to the second mobile station and a base station;
   transmitting the first uplink segment for the second mobile station from the second mobile station to the first mobile station and the base station;
   receiving the transmitted first uplink segment for the first mobile station at both the second mobile station and the base station;
   decoding the received first uplink segment for the first mobile station using a CRC code at and the second mobile station;
   receiving the transmitted first uplink segment for the second mobile station at both the first mobile station and the base station;
   decoding the received first uplink segment for the second mobile station using the CRC code at the first mobile station;
   responsive to the decoding of the received first uplink segments, transmitting the second uplink segments from each of the first mobile station and the second mobile station to the base station; and
   wherein the foregoing steps provide uplink transmission diversity for the first mobile station and the second mobile station.

7. The method of claim 6, wherein the step of transmitting the second uplink segments further comprises the step of transmitting the second uplink segment of the second mobile station from the first mobile station to the base station if the first mobile station decodes the first uplink segment of the second mobile station.

8. The method of claim 6, wherein the step of transmitting the second uplink segment further comprises the step of transmitting the second uplink segment of the first mobile station from the first mobile station to the base station if the first mobile station cannot decode the first uplink segment of the second mobile station.

9. A wireless communications system, comprising:
   a first mobile station that divides an uplink error correcting codeword into a first uplink segment and a second uplink segment and transmits the first uplink segment to both a second mobile station and a base station;
   the second mobile station receives the transmitted first uplink segment from the first mobile station, decodes the received first uplink segment, and responsive to the decoding, transmits a third uplink segment to the base station;
   the base station receives the first uplink segment from the first mobile station and the third uplink segment from the second mobile station; and
   wherein the foregoing steps provide uplink transmission diversity for the first mobile station.

10. The system of claim 9, wherein the first mobile station further:
    divides source data into blocks;
    adds bits to the blocks for a CRC code; and
    encodes the blocks using an error correcting code to create the uplink error correcting codeword.

11. The system of claim 9, wherein the second mobile station further decodes the received first uplink segment using a CRC code.

12. The system of claim 9, wherein the second mobile station transmits the second uplink segment of the first mobile station from the first mobile station as the third uplink segment to the base station if the second mobile station successfully decodes the first uplink segment of the first mobile station.

13. The system of claim 9, wherein the second mobile station transmits a second uplink segment of the second mobile station as the third uplink segment to the base station if the second mobile station cannot decode the first uplink segment of the first mobile station.

14. A mobile station in a wireless communications system, comprising:
    a receiver;
    a transmitter;
    wherein the mobile station is configured to:
       divide an uplink error correcting codeword into a first uplink segment and a second uplink segment;
       transmit the first uplink segment to both a second mobile station and a base station using the transmitter;
       receive a transmitted first uplink segment from the second mobile station using the receiver;
       decode the received first uplink segment for the second mobile station;
       responsive to the decoding of the received first uplink segment for the second mobile station, transmitting a third uplink segment to the base station using the transmitter; and
    wherein the foregoing steps provide uplink transmission diversity for the second mobile station.

15. The mobile station of claim 14, wherein the step of dividing further comprising the steps of:
    dividing source data into blocks;
    adding bits to the blocks for a CRC code; and
    encoding the blocks using an error correcting code to create the uplink error correcting codeword.

16. The mobile station of claim 14, wherein the step of decoding further comprises the step of decoding the received first uplink segment using a CRC code.

17. The mobile station of claim 14, wherein the step of transmitting the third uplink segment further comprises the step of transmitting a second uplink segment of the other mobile station to the base station if the mobile station decodes the first uplink segment of the other mobile station.

18. The mobile station of claim 14, wherein the step of transmitting the third uplink segment further comprises the step of transmitting the second uplink segment of the mobile station to the base station if the mobile station cannot decode the first uplink segment of the other mobile station.

19. The method as recited in claim 2, wherein the CRC code is used to determine whether the first uplink segment was successfully decoded.

20. The method as recited in claim 1, wherein:
- the uplink error correcting codeword comprises K/R total code bits wherein K is a total number of bits per source block and R is an overall rate code;
- the uplink error correction codeword is divided via puncturing, product codes or concatenation;
- the first uplink segment comprises a length of $N_1$ bits and the second uplink segment comprises a length of $N_2$ bits wherein $N_1=K/R_1$ and $N_2=N-N_1$ and $R_1$ is a rate code for the first uplink segment;
- a level of cooperation between the first mobile station and the second mobile station comprises $N_2/N$ such that a lower level of cooperation increases the probability of successful decoding and decreases the wireless uplink transmission diversity; and
- the level of cooperation is between approximately 25% and 50%.

21. The method as recited in claim 1, further comprising the step of adding a bit in the second uplink segment at each of the first mobile station and the second mobile station to indicate whether the first uplink segment was successfully decoded at the respective mobile stations.

22. The method as recited in claim 1, further comprising the step of decoding the first uplink segments and the second uplink segments from the first mobile station and the second mobile station at the base station.

23. The method as recited in claim 22, wherein the second uplink segments are decoded based on a bit added to the second uplink segments that indicates whether the first uplink segment was successfully decoded by the mobile station transmitting the second uplink segment to the base stations.

24. The method as recited in claim 22, wherein the second uplink segments are decoded based on four scenarios until the second uplink segments are successfully decoded by the base station, wherein the four scenarios comprise: (a) the first mobile station and the second mobile station successfully decoded the first uplink segments, (b) the first mobile station successfully decoded the first uplink segment received from the second mobile station and the second mobile station could not decode the first uplink segment received from the first mobile station, (c) the first mobile station could not decode the first uplink segment received from the second mobile station and the second mobile station successfully decoded the first uplink segment received from the first mobile station, and (d) the first mobile station and the second mobile station could not decode the first uplink segments.

\* \* \* \* \*